(12) United States Patent
Pujol et al.

(10) Patent No.: US 10,620,086 B2
(45) Date of Patent: Apr. 14, 2020

(54) TEST BENCH FOR GENERATING DYNAMIC LOADS ON AN ACTUATOR AND METHOD FOR PERFORMING TESTS ON AN ACTUATOR USING SAID TEST BENCH

(71) Applicant: Airbus Operations S.A.S., Toulouse (FR)

(72) Inventors: Christophe Pujol, Castelnau d'estretefonds (FR); Arnaud Chevalier, Blagnac (FR)

(73) Assignee: Airbus Operations S.A.S. (FR)

( * ) Notice: Subject to any disclaimer, the term of this patent is extended or adjusted under 35 U.S.C. 154(b) by 231 days.

(21) Appl. No.: 15/919,711

(22) Filed: Mar. 13, 2018

(65) Prior Publication Data
US 2018/0266915 A1 Sep. 20, 2018

(30) Foreign Application Priority Data

Mar. 20, 2017 (FR) ...................................... 17 52266

(51) Int. Cl.
*G01M 9/00* (2006.01)
*G01M 9/06* (2006.01)

(52) U.S. Cl.
CPC .................................. *G01M 9/062* (2013.01)

(58) Field of Classification Search
CPC ..................................................... G01M 9/062
USPC ......................................................... 73/147
See application file for complete search history.

(56) References Cited

U.S. PATENT DOCUMENTS

| | | | | |
|---|---|---|---|---|
| 7,966,872 B2* | 6/2011 | Lutke | ........................ | B64C 1/36 73/118.03 |
| 10,246,196 B2* | 4/2019 | Pautis | ..................... | B64D 27/26 |
| 2013/0298659 A1* | 11/2013 | Smith | ...................... | G01M 9/06 73/147 |
| 2016/0376003 A1* | 12/2016 | Feldman | ............... | B64C 39/005 703/2 |
| 2017/0029092 A1* | 2/2017 | Gemmati | .................. | B64C 9/02 |

FOREIGN PATENT DOCUMENTS

DE 1172875 B 6/1964

OTHER PUBLICATIONS

FR 17 52266 Search Report dated Nov. 8, 2017.

\* cited by examiner

*Primary Examiner* — Jamel E Williams
(74) *Attorney, Agent, or Firm* — Lerner, David, Littenberg, Krumholz & Mentlik, LLP

(57) ABSTRACT

A test bench for generating aerodynamic loads on an actuator to be tested includes a force actuator configured to generate at least one dynamic load, the test bench being configured to transmit the dynamic load produced by the force actuator to the actuator to be tested, and a controller for controlling the dynamic load generated by the force actuator depending on a pressure, measured by a pressure sensor, inside one of the chambers of the force actuator.

4 Claims, 2 Drawing Sheets

TEST BENCH FOR GENERATING DYNAMIC LOADS ON AN ACTUATOR AND METHOD FOR PERFORMING TESTS ON AN ACTUATOR USING SAID TEST BENCH

FIELD OF THE INVENTION

The present application relates to a test bench for generating dynamic loads on an actuator and to a method for performing tests on an actuator using said test bench.

BACKGROUND OF THE INVENTION

An actuator 10 comprises a body 12 and a stem 14 that is mobile with respect to the body 12 in a direction of translation 16. In one application, an actuator 10 may be coupled to a mobile aerodynamic surface, such as a rudder or an aileron for example, and subjected, during operation of an aircraft, to significant loads that may oscillate.

In one embodiment visible in FIG. 1, a test bench 18 intended to generate such dynamic loads on an actuator 10 comprises a fixed frame 20 and a frame 22 pivotable about a pivot axis A22 with respect to the fixed frame 20, which pivotable frame has a first portion 22.1 positioned on a first side of the pivot axis A22 and a second portion 22.2 positioned on a second side of the pivot axis A22.

During tests, the actuator 10 is inserted between the fixed frame 20 and the first portion 22.1 of the mobile frame 22, the body 12 being linked to the fixed frame 20 by virtue of a first attachment 24.1 and to the mobile frame 22 by virtue of a second attachment 24.2. The actuator 10 is oriented in such a way that the direction of translation 16 is perpendicular to the pivot axis A22.

To generate the dynamic loads, the test bench 18 comprises a mechanical spring 26 of which a first end is linked to the fixed frame 20 by virtue of a first attachment 26.1 and a second end is linked to the mobile frame 22 by virtue of a second attachment 26.2, the mechanical spring 26 being oriented in a direction that is substantially parallel to the direction of translation 16.

The test bench 18 comprises a damping actuator 28 that is positioned parallel to the actuator 10 to be tested and that includes a body linked to the fixed frame 20 by virtue of a first attachment 28.1 and a stem that is mobile with respect to the body and linked to the first portion 22.1 of the mobile frame 22 by virtue of a second attachment 28.2.

The test bench 18 makes it possible to generate dynamic loads that are oriented in the direction of translation 16.

Depending on the ratio between the distance separating the second attachment 24.2 linking the actuator 10 to be tested and the pivot axis A22 and the distance separating the second attachment 26.2 of the mechanical spring 26 and the pivot axis A22, on the stiffness of the mechanical spring 26, on the damping of the damping actuator 28, and on the initial compression or extension of the mechanical spring 26, it is possible to adjust the initial amplitude, the oscillation frequency and the level of damping of the dynamic load.

This test bench is not satisfactory because, for each flight point to be simulated, the implementation is relatively time-consuming and complex.

BRIEF SUMMARY OF THE INVENTION

Aspects of the present invention may rectify the drawbacks of the prior art.

One aspect of the invention is a test bench for generating aerodynamic loads on an actuator to be tested, said test bench comprising a fixed frame and a frame that is mobile with respect to the fixed frame, the actuator to be tested being inserted between the fixed frame and the mobile frame during a test, characterized in that it comprises:

a force actuator configured to generate at least one dynamic load and inserted between the fixed frame and the mobile frame, the test bench being configured to transmit the dynamic load produced by the force actuator to the actuator to be tested, at least one pressure sensor configured to measure a pressure inside at least one chamber of the force actuator, and a controller for controlling the dynamic load generated by the force actuator depending on the pressure measured inside one of the chambers.

The test bench according to an embodiment of the invention makes it possible to generate dynamic loads, applied to an actuator to be tested, that are close to those to which the latter is subjected during operation on an aircraft.

In addition, it makes it possible to recover the various points of the various force profiles to which the actuator to be tested is subjected during operation on the aircraft more quickly than in the prior art.

According to another feature, the test bench comprises a closed-loop control system configured, on the basis of a setpoint value that corresponds to a desired value of the force generated by the force actuator and of a value of the pressure in one of the chambers measured by the pressure sensor, to determine a corrective value of an input signal transmitted to the controller.

According to yet another feature, the closed-loop control system comprises a comparator configured to compare the setpoint value with the measured value of the pressure and to deduce the corrective value therefrom, and an integral proportional corrector.

Another aspect of the invention is a method for performing tests on an actuator using a test bench as defined above, characterized in that the test bench is linked to at least one controller of a flight simulator, which controller is configured to transmit real-time values for the setpoint value.

Other features and advantages will emerge from the following description of the invention, which description is given solely by way of example, with reference to the appended drawings, in which:

DETAILED DESCRIPTION

Figure 1:
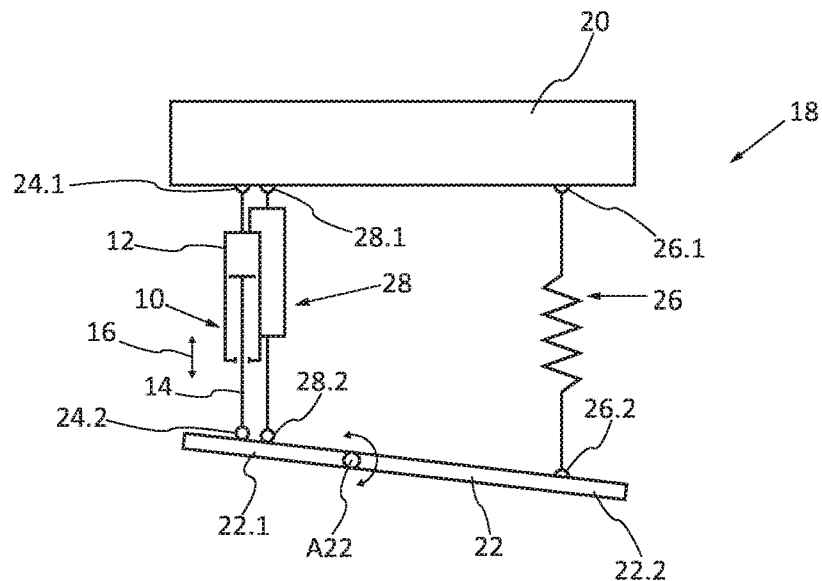
FIG. 1 is a diagram of a test bench illustrating an embodiment from the prior art.
Figure 2:
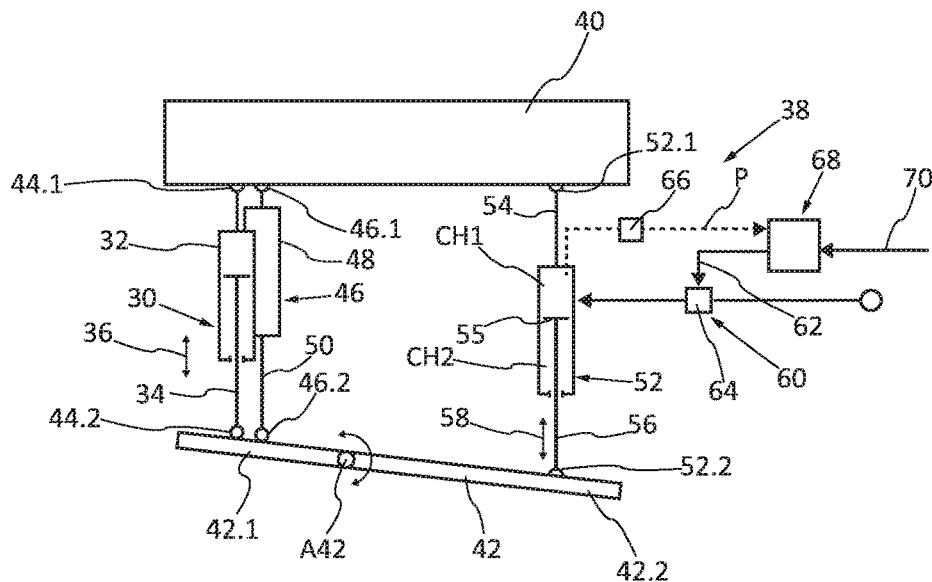
FIG. 2 is a diagram of a test bench illustrating an embodiment of the invention.

An actuator 30 to be tested comprises a body 32 and a stem 34 that is mobile with respect to the body 32 in a first direction of translation 36, as illustrated in FIG. 2.

A test bench 38 makes it possible to exert a dynamic load, oriented in a direction approximately coincident with the first direction of translation 36, on this actuator 30 to be tested.

This test bench 38 comprises a fixed frame 40 and a frame 42 pivotable about a pivot axis A42 with respect to the fixed frame 40, which pivotable frame has a first portion 42.1 positioned on a first side of the pivot axis A42 and a second portion 42.2 positioned on a second side of the pivot axis A42.

During a test, the actuator 30 is inserted between the fixed frame 40 and the mobile frame 42. To this end, the fixed frame 40 comprises a first attachment 44.1 configured to link the body 32 or the stem 34 to the fixed frame 40. The first portion 42.1 of the mobile frame 42 comprises a second attachment 44.2 configured to link the stem 34 or the body 32 to the mobile frame 42. The first attachment 44.1 and the second attachment 44.2 are positioned such that the direction of movement 36 is perpendicular to the pivot axis A42.

The test bench 38 may comprise a damping system 46 inserted between the fixed frame 40 and the mobile frame 42. In one embodiment, the damping system 46 is a damping actuator that includes a body 48 linked, via a first attachment 46.1, to the fixed frame 40 or to the mobile frame 42, and a stem 50 that is mobile with respect to the body 48 and linked, via a second attachment 46.2, to the mobile frame 42 or to the fixed frame 40. The first and second attachments 46.1 and 46.2 of the damping actuator are positioned in such a way that the stem 50 of the damping actuator moves in translation in a direction parallel to the first direction of translation 36 of the actuator 30 to be tested.

The fixed frame 40, the mobile frame 42, and the first and second attachments 44.1 and 44.2 that are intended for the actuator 30 to be tested and also the optional damping system 46 are not described in further detail as they may be identical to those of the test bench from the prior art.

According to one feature of the invention, the test bench 38 comprises a force actuator 52 configured to generate at least one dynamic load and inserted between the fixed frame 40 and the mobile frame 42, the test bench 38 being configured to transmit the dynamic load produced by the force actuator 52 to the actuator 30 to be tested.

The force actuator 52 comprises a body 54 and a piston 55 that slides inside the body 54 and that is extended by a stem 56 that is mobile with respect to the body 54 in a second direction of translation 58. The piston 55 delineates two chambers CH1 and CH2 inside the body 54. The body 54 is linked, via a first attachment 52.1, to the fixed frame 40 or to the mobile frame 42, and the stem 56 is linked, via a second attachment 52.2, to the mobile frame 42 or to the fixed frame 40, the first and second attachments 52.1 and 52.2 being positioned such that the second direction of translation 58 is approximately parallel to the first direction of translation 36.

In one configuration, the second attachment 52.2 is positioned on the second portion 42.2 of the mobile frame 42, and the distance between the second attachment 52.2 of the force actuator 52 and the pivot axis A42 is greater than the distance between the second attachment 44.2 of the actuator 30 to be tested and the pivot axis A42, so as to obtain a lever arm effect.

The first and second attachments 52.1 and 52.2, which are intended for the force actuator 52, may be identical to the attachments intended for the mechanical spring of the test bench from the prior art. The force actuator 52 is thus positioned on the existing test bench in place of the mechanical spring, without the need to modify the attachments.

The test bench 38 also comprises a controller 60 for controlling the dynamic load generated by the force actuator 52 depending on an input signal 62. In the embodiments, the controller 60 comprises a single servo valve 64 linked to one of the chambers CH1 or CH2, or two servo valves, one for each chamber CH1 and CH2.

By way of example, the force actuator 52 is a hydraulic actuator, and each servo valve 64 is electrohydraulic and is configured to convert an electrical input signal 62 into a proportional hydraulic magnitude, such as a flow rate or a pressure. The test bench 38 comprises at least one pressure sensor 66 configured to measure the pressure inside at least one chamber CH1, CH2, the controller 60 being configured to control the dynamic load generated by the force actuator 52 depending on the pressure measured inside the chamber(s) CH1, CH2, so as to drive the force of the force actuator 52.

In the embodiments, the test bench 38 comprises a pressure sensor 66 for one of the chambers CH1 or CH2 or two pressure sensors 66, one for each chamber CH1 and CH2.

In one configuration, the test bench 38 comprises a closed-loop control system 68 configured, on the basis of a setpoint value 70 that corresponds to a desired value of the force generated by the force actuator 52 and of a value P of the pressure in one of the chambers CH1, CH2 measured by the pressure sensor 66, to determine a corrective value E of the input signal 62 transmitted to the controller 60.

Figure 3:
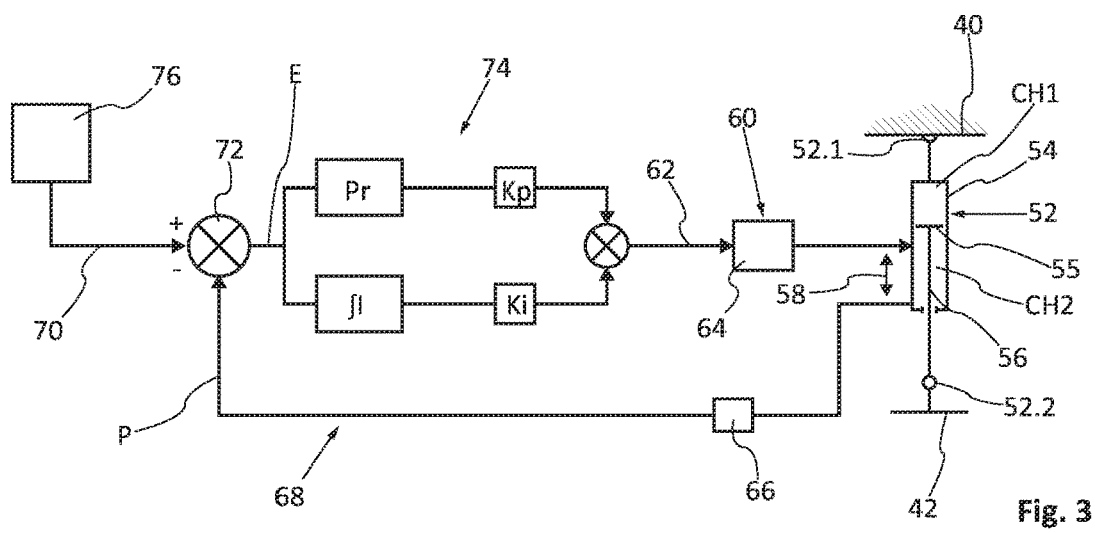
FIG. 3 is a diagram of a closed-loop control system illustrating an embodiment of the invention.

In one configuration visible in FIG. 3, the closed-loop control system 68 comprises:
a comparator 72 configured to compare the setpoint value 70 with the measured value P of the pressure and to deduce the corrective value E therefrom,
an integral proportional corrector 74 that includes a proportional correction Pr intended to multiply the error E by a gain Kp and an integral correction ∫I intended to integrate the error E and to divide it by a gain Ki.

According to one mode of operation, the test bench 38 is linked to at least one controller of a flight simulator 76, which controller is configured to transmit real-time values for the setpoint value 70.

The test bench 38 according to the invention makes it possible to generate dynamic loads, applied to an actuator 30 to be tested, that are close to those to which the latter is subjected during operation on an aircraft.

Figure 4A:
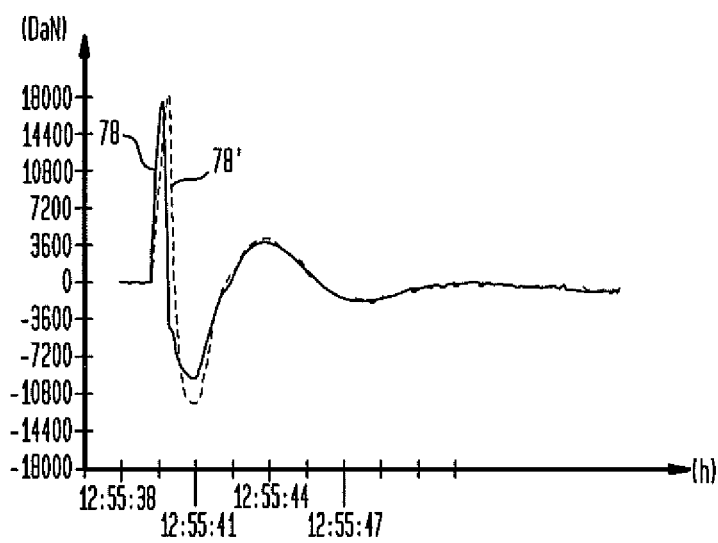
FIGS. 4A to 4C are diagrams illustrating force profiles that are predefined and simulated for one-off turbulence, a manoeuvre and turbulence, respectively.
Figure 4B:
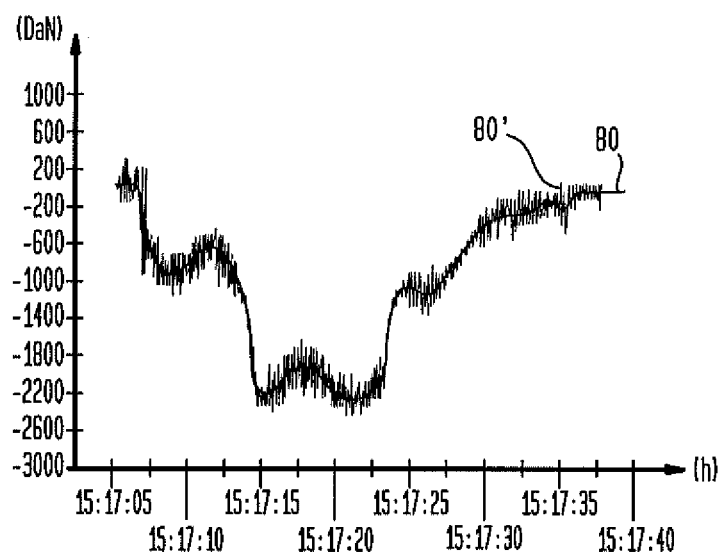
Figure 4C:
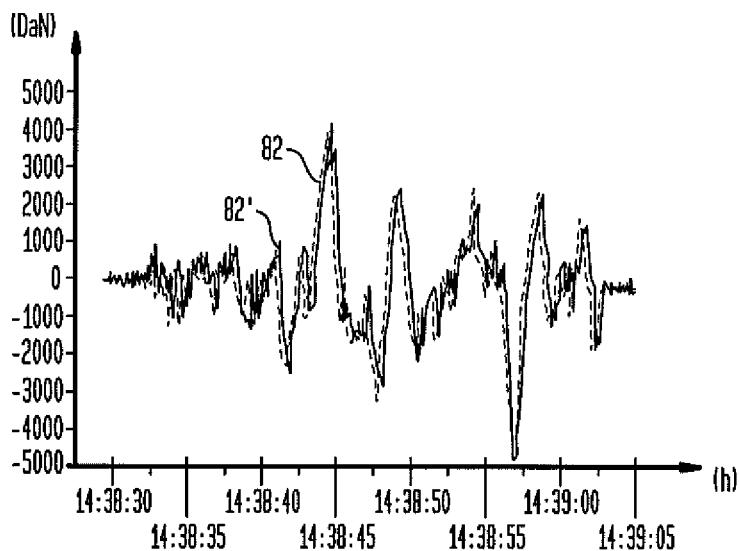

FIGS. 4A to 4C show diagrams each illustrating predefined force profiles 78, 80, 82 corresponding to one-off turbulence, a manoeuvre and turbulence, respectively, and force profiles 78', 80', 82' simulated by the test bench 38, corresponding to the predefined force profiles.

It is noted that the simulated force profiles 78', 80' and 82' are very close to the predefined force profiles 78, 80, 82.

According to another advantage, the test bench makes it possible to obtain the various points of the various force profiles to which the actuator to be tested is subjected during operation in a much shorter time than in the prior art.

Thus, by using the test bench, it is possible to justify integrating the tested actuator into the master minimum equipment list (MMEL).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

What is claimed is:

1. A test bench for generating aerodynamic loads on an actuator to be tested, said test bench comprising a fixed frame and a frame that is mobile with respect to the fixed frame, the actuator to be tested being inserted between the fixed frame and the mobile frame during a test, the test bench comprising:
   - a force actuator configured to generate at least one dynamic load and inserted between the fixed frame and the mobile frame, the test bench being configured to transmit the dynamic load produced by the force actuator to the actuator to be tested;
   - at least one pressure sensor configured to measure a pressure inside at least one chamber of the force actuator; and
   - a controller for controlling the dynamic load generated by the force actuator depending on the pressure measured inside one of the chambers.

2. The test bench according to claim 1, further comprising a closed-loop control system configured, on the basis of a setpoint value that corresponds to a desired value of the force generated by the force actuator and of a value (P) of the pressure in one of the chambers measured by the pressure sensor, to determine a corrective value (E) of an input signal transmitted to the controller.

3. The test bench according to claim 2, wherein the closed-loop control system comprises a comparator configured to compare the setpoint value with the measured value (P) of the pressure and to deduce the corrective value (E) therefrom, and an integral proportional corrector.

4. A method for performing tests on an actuator using a test bench according to claim 2, wherein the test bench is linked to at least one controller of a flight simulator, which controller is configured to transmit real-time values for the setpoint value.

* * * * *